United States Patent
Yang et al.

(10) Patent No.: US 9,742,454 B2
(45) Date of Patent: Aug. 22, 2017

(54) METHOD, APPARATUS AND TERMINAL FOR ELECTROMAGNETIC RADIATION CONVERSION

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jiuxia Yang, Beijing (CN); Feng Bai, Beijing (CN); Yiming Zhao, Beijing (CN); Xiao Sun, Beijing (CN); Bing Bai, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 291 days.

(21) Appl. No.: 14/344,211

(22) PCT Filed: Aug. 1, 2013

(86) PCT No.: PCT/CN2013/080615
§ 371 (c)(1),
(2) Date: Mar. 11, 2014

(87) PCT Pub. No.: WO2014/187029
PCT Pub. Date: Nov. 27, 2014

(65) Prior Publication Data
US 2016/0126998 A1    May 5, 2016

(30) Foreign Application Priority Data
May 20, 2013 (CN) .......................... 2013 1 0187443

(51) Int. Cl.
H04B 1/38 (2015.01)
H04B 10/00 (2013.01)
H04B 1/3827 (2015.01)

(52) U.S. Cl.
CPC ........... *H04B 1/3838* (2013.01); *H04B 10/00* (2013.01)

(58) Field of Classification Search
CPC .............................. H04B 1/3838; H04B 10/00
See application file for complete search history.

(56) References Cited

U.S. PATENT DOCUMENTS 6,184,835 B1   2/2001   Chen et al.
6,314,277 B1   11/2001  Hsu et al.
(Continued)

FOREIGN PATENT DOCUMENTS

CN   101420243 A   4/2009
CN   201752114 U   2/2011
(Continued)

OTHER PUBLICATIONS

International Search Report issued Jan. 10, 2014; PCT/CN2013/080615.
(Continued)

*Primary Examiner* — Brandon Miller
(74) *Attorney, Agent, or Firm* — Ladas & Parry LLP

(57) ABSTRACT

A method, an apparatus and a terminal for electromagnetic radiation conversion relates to the field of electromagnetic radiation protection technique, the method includes the steps of receiving a high frequency electromagnetic radiation by a high frequency receiving module, converting the high frequency electromagnetic radiation into a low frequency electromagnetic radiation by a frequency conversion module, and emitting, by a low frequency emission module, the low frequency electromagnetic radiation converted by the
(Continued)

frequency conversion module. The method, apparatus and terminal for electromagnetic radiation conversion can be used to convert the harmful electromagnetic radiation emitted by the terminal into the electromagnetic radiation which benefits the human health and can also have a cosmetic effect.

6 Claims, 1 Drawing Sheet

(56) References Cited

U.S. PATENT DOCUMENTS

| | | | |
|---|---|---|---|
| 9,069,083 B2 * | 6/2015 | Goldstein | G01T 1/20 |
| 2010/0240421 A1 * | 9/2010 | Sekora | H04B 1/3838 455/575.1 |
| 2012/0292518 A1 | 11/2012 | Goldstein | |
| 2013/0055005 A1 * | 2/2013 | Lee | H04B 1/3838 713/501 |
| 2013/0203363 A1 * | 8/2013 | Gratt | A61N 1/08 455/73 |

FOREIGN PATENT DOCUMENTS

| | | |
|---|---|---|
| CN | 102215663 A | 10/2011 |
| CN | 203301474 U | 11/2013 |
| JP | 03-196111 A | 8/1991 |
| WO | 2012/143667 A2 | 10/2012 |

OTHER PUBLICATIONS

First Chinese Office Action dated Nov. 16, 2015; Appln. No. 201310187443.1.
International Preliminary Report on Patentability issued Nov. 24, 2015; PCT/CN2013/080615.
Second Chinese Office Action dated May 26, 2016; Appln. No. 201310187443.1.
Third Chinese Office Action dated Oct. 21, 2016; Appln. No. 201310187443.1.
Fourth Chinese Office Action dated Mar. 14, 2017; Appln. No. 201310187443.1.

* cited by examiner

METHOD, APPARATUS AND TERMINAL FOR ELECTROMAGNETIC RADIATION CONVERSION

TECHNICAL FIELD

The present disclosure relates to the field of electromagnetic radiation protection technique, particularly to a method, an apparatus and a terminal for electromagnetic radiation conversion.

BACKGROUND

With the development of the mobile communication, the terminal equipments such as mobile phones have become the necessary communication tools in the people's daily life, which have brought many conveniences to the people's life. However, the influence of the electromagnetic radiation of the terminals on the human health has increasingly gained the concern of the people. At present, the terminal equipments such as the mobile phones emit a high frequency electromagnetic radiation whose frequency is 0.98 GHz~1.8 GHz. As a non-ionizing radiation, when radiating in a relatively low power density, the harm to the human health caused by the electromagnetic radiation is long-term and chronic. The higher the power of the terminal is and the more frequently it is used, the greater the damage to the human health caused by the electromagnetic radiation generated by the terminal is. Therefore, it is very important to figure out how to reduce the damage to the human health by the electromagnetic radiation.

SUMMARY

In view of the above, the technical problem to be solved by the embodiments of the present invention is to provide a method, an apparatus and a terminal for electromagnetic radiation conversion, by which the harmful electromagnetic radiation emitted by the terminal can be converted into the electromagnetic radiation which benefits the human health.

To solve the above technical problem, the technical solutions of the present disclosure can be implemented as follows.

There is provided a method for electromagnetic radiation conversion comprising the steps of: receiving a high frequency electromagnetic radiation by a high frequency receiving module; converting the high frequency electromagnetic radiation into a low frequency electromagnetic radiation by a frequency conversion module; and emitting, by a low frequency emission module, the low frequency electromagnetic radiation converted by the frequency conversion module. The frequency of the high frequency electromagnetic radiation is 0.3 GHz~300 GHz. The frequency of the low frequency electromagnetic radiation is 7.8 Hz~12 Hz.

There is further provided an apparatus for electromagnetic radiation conversion, the apparatus comprises a high frequency receiving module for receiving a high frequency electromagnetic radiation, a frequency conversion module for converting the high frequency electromagnetic radiation received by the high frequency receiving module into a low frequency electromagnetic radiation, and a low frequency emission module for emitting the low frequency electromagnetic radiation converted by the frequency conversion module.

There is further provided a terminal, the terminal comprises a main body equipped with a rechargeable battery and a back cover plate; and a cover engaged with the main body; the terminal further comprises the apparatus for electromagnetic radiation conversion described as above arranged on the main body and/or the cover. The high frequency receiving module, the frequency conversion module and the low frequency emission module in the apparatus for electromagnetic radiation conversion are all arranged on the cover. The cover is the front panel of the terminal. The high frequency receiving module and the frequency conversion module in the apparatus for electromagnetic radiation conversion are arranged on the back cover plate, and the low frequency emission module is arranged on the cover. The high frequency receiving module and the frequency conversion module in the apparatus for electromagnetic radiation conversion are arranged in a position on the back cover plate corresponding to the lateral side of the terminal, and the low frequency emission module is arranged on the cover. The high frequency receiving module and the frequency conversion module in the apparatus for electromagnetic radiation conversion are arranged in a position on the cover corresponding to the lateral side of the terminal, and the low frequency emission module is arranged on the cover.

In the method, the apparatus and the terminal for electromagnetic radiation conversion provided in the embodiments of the present invention, the high frequency receiving module collects the harmful high frequency electromagnetic radiation generated by the terminals, display devices, or other equipments, and the frequency conversion module converts the high frequency electromagnetic radiation into the low frequency electromagnetic radiation, and the low frequency emission module emits the converted low frequency electromagnetic radiation, and the frequency of the low frequency electromagnetic radiation is in 7.8 Hz~12 Hz; since the low frequency electromagnetic radiation in this frequency band can penetrate into the tissues inside the human body, facilitate the resonation of the water molecules in the human body cells, enhance the vitality of the cells, accelerate blood circulation, promote metabolism, improve the regeneration capacity of the tissue, and play a role of activating the immune system and suppressing the aging of the cells effectively. Therefore, the embodiments of the present invention can not only convert the harmful electromagnetic radiation into the beneficial electromagnetic radiation for the human health, but also have a cosmetic effect.

DETAILED DESCRIPTION OF THE EXEMPLARY EMBODIMENTS

The basic concept of the present invention is that a high frequency receiving module is arranged to receive a high frequency electromagnetic radiation, a frequency conversion module converts the high frequency electromagnetic radiation into a low frequency electromagnetic radiation, and a low frequency emission module emits the converted low frequency electromagnetic radiation.

In the embodiments of the present invention, the high frequency electromagnetic radiation may come from the terminals such the mobile phones, application products (APP), Monitors, Notebook computers (NB), or the display devices such as televisions, or other equipments which can generate a harmful electromagnetic radiation.

Hereinafter, the embodiments of the present invention will be described in detail in connection with the accompanying figures and the implementations.

Figure 1:
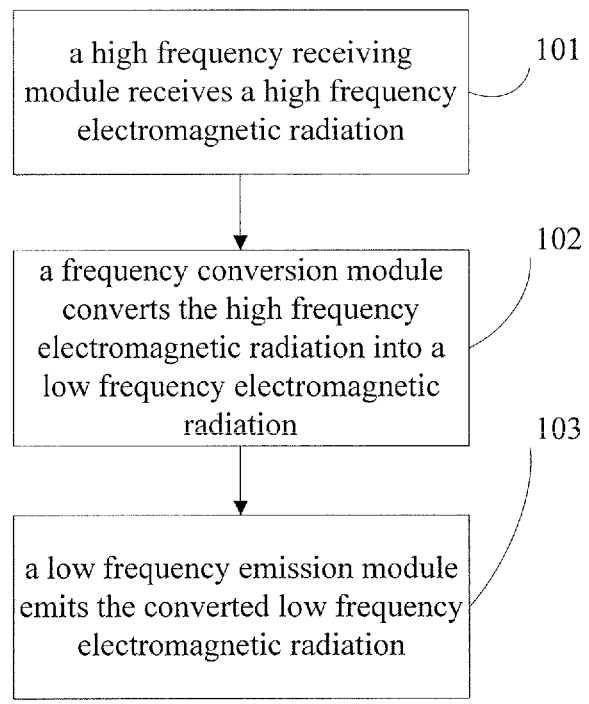
FIG. 1 is a schematic diagram of a flow for implementing a method for electromagnetic radiation conversion according to an embodiment of the present invention.

FIG. 1 is a schematic diagram of a flow for implementing the method for electromagnetic radiation conversion, as shown in FIG. 1, the method comprises the steps of 101, 102, and 103.

In the step 101, the high frequency receiving module receives a high frequency electromagnetic radiation;

In particular, the high frequency receiving module collects the harmful high frequency electromagnetic radiation generated by the terminals, display devices, or other equipments. Herein, the frequency of the high frequency electromagnetic radiation is 0.3 GHz~300 GHz.

In the step 102, the frequency conversion module converts the high frequency electromagnetic radiation into a low frequency electromagnetic radiation;

Herein, the frequency conversion module converts the high frequency electromagnetic radiation collected in the step 101, for example, the high frequency electromagnetic radiation with a frequency of 0.98 GHz~1.8 GHz emitted by the terminals such as the mobile phones, into the low frequency energy which is beneficial to the human body, and the low frequency energy releases the energy in a form of a low frequency electromagnetic radiation with a frequency of 7.8 Hz~12 Hz.

Herein, the low frequency electromagnetic radiation can penetrate into the tissues inside the human body, facilitate the resonation of the water molecules in the human body cells, enhance the vitality of the cells, accelerate blood circulation, promote metabolism, improve the regeneration capacity of the tissues, play a role of activating the immune system and suppressing the aging of the cells effectively, and have a cosmetic effect.

In the step 103, the low frequency emission module emits the converted low frequency electromagnetic radiation.

Figure 2:
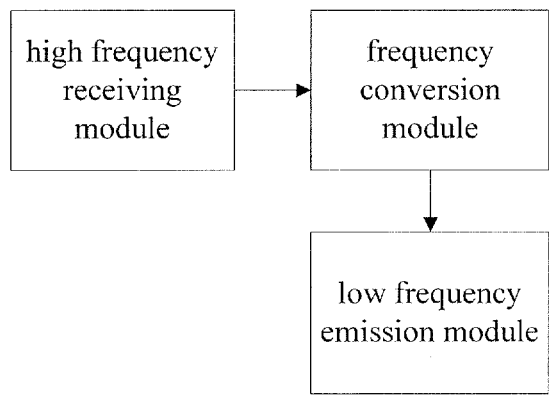
FIG. 2 is a schematic diagram of a structure of an apparatus for electromagnetic radiation conversion according to an embodiment of the present invention.

The embodiments of the present invention further provide an apparatus for electromagnetic radiation conversion, and as shown in FIG. 2, the apparatus comprises a high frequency receiving module, a frequency conversion module and a low frequency emission module, wherein, the high frequency receiving module is used for receiving a high frequency electromagnetic radiation;

the frequency conversion module is used for converting the high frequency electromagnetic radiation received by the high frequency receiving module into a low frequency electromagnetic radiation; and the low frequency emission module is used for emitting the low frequency electromagnetic radiation converted by the frequency conversion module.

Hereafter, the application of the apparatus for electromagnetic radiation conversion according to the embodiment of the present invention is described by taking a terminal such as a mobile phone as an example.

The embodiment of the present invention further provides a terminal comprising a main body equipped with a rechargeable battery and a back cover plate and a cover engaged with the main body; the terminal further comprises an apparatus for electromagnetic radiation conversion arranged on the main body and/or the cover.

Optionally, the terminal comprises a main body equipped with a rechargeable battery and a back cover plate and a cover engaged with the main body; the terminal further comprises the apparatus for electromagnetic radiation conversion as described above, and the high frequency receiving module, the frequency conversion module and the low frequency emission module in the apparatus for electromagnetic radiation conversion are all arranged on the cover. Herein, the cover is the front panel of the terminal.

Optionally, the embodiments of the present invention further provide a terminal comprising a main body equipped with a rechargeable battery and a back cover plate and a cover engaged with the main body; the terminal further comprises the apparatus for electromagnetic radiation conversion as described above, and the high frequency receiving module and the frequency conversion module in the apparatus for electromagnetic radiation conversion are arranged on the back cover plate, and the low frequency emission module is arranged on the cover.

Optionally, the embodiments of the present invention further provide a terminal comprising a main body equipped with a rechargeable battery and a back cover plate and a cover engaged with the main body, and the terminal further comprises the apparatus for electromagnetic radiation conversion as described above, the high frequency receiving module and the frequency conversion module in the apparatus for electromagnetic radiation conversion are arranged in a position on the back cover plate or on the cover corresponding to the lateral side of the terminal, and the low frequency emission module is arranged on the cover.

In the solutions of the illustrative embodiments, all the low frequency emission modules are arranged on the cover, that is, they are arranged on the front side of the terminals. Thus, when an user is using the terminal, for example, when the user is answering the telephone, the front side of the terminal is just opposite to the face of the person, and the low frequency emission module arranged on the cover emits the low frequency electromagnetic radiation with a frequency of 7.8 Hz~12 Hz to the user, the low frequency electromagnetic radiation can penetrate into the tissues inside the human body, facilitate the resonation of water molecules in the human body cells, enhance the vitality of the cells, accelerate blood circulation, promote metabolism, improve the regeneration capacity of the tissue, and play a role of activating the immune system and suppressing the aging of the cells effectively, and thus, the embodiments of the present invention can not only convert the harmful electromagnetic radiation into the beneficial electromagnetic radiation for the human health, but also have a cosmetic effect.

Those described above are only illustrative embodiments of the present disclosure, and in no way limit the protection scope of the present disclosure. Those ordinary skilled in the art may make various modifications without departing from the spirit and scope of the present disclosure, and all of those technique solutions of equivalences are belonging to protection scope of the present disclosure.

What is claimed is:

1. A terminal, comprising a main body equipped with a rechargeable battery and a back cover plate, and a cover engaged with the main body, wherein the terminal further comprises an apparatus for electromagnetic radiation conversion arranged on the main body and/or the cover, and the apparatus for electromagnetic radiation conversion comprises: a high frequency receiving module for receiving a high frequency electromagnetic radiation, a frequency conversion module for converting the high frequency electromagnetic radiation received by the high frequency receiving module into a low frequency electromagnetic radiation, and a low frequency emission module for emitting the low frequency electromagnetic radiation converted by the frequency conversion module,
   wherein the high frequency receiving module and the frequency conversion module in the apparatus for electromagnetic radiation conversion are arranged on the back cover plate, and the low frequency emission module is arranged on the cover.

2. The terminal of claim 1, wherein the high frequency receiving module, the frequency conversion module and the low frequency emission module in the apparatus for electromagnetic radiation conversion are all arranged on the cover.

3. The terminal of claim 2, wherein the cover is a front panel of the terminal.

4. The terminal of claim 1, wherein the cover is a front panel of the terminal.

5. The terminal of claim 1, wherein the high frequency receiving module and the frequency conversion module in the apparatus for electromagnetic radiation conversion are arranged in a position on the back cover plate corresponding to a lateral side of the terminal, and the low frequency emission module is arranged on the cover.

6. The terminal of claim 1, wherein the high frequency receiving module and the frequency conversion module in the apparatus for electromagnetic radiation conversion are arranged in a position on the cover corresponding to a lateral side of the terminal, and the low frequency emission module is arranged on the cover.

* * * * *